(12) United States Patent
Manubolu et al.

(10) Patent No.: US 8,083,206 B2
(45) Date of Patent: Dec. 27, 2011

(54) PRECISION GROUND ARMATURE ASSEMBLY FOR SOLENOID ACTUATOR AND FUEL INJECTOR USING SAME

(75) Inventors: Avinash R. Manubolu, Edwards, IL (US); Shriprasad G. Lakhapati, Peoria, IL (US); Stephen R. Lewis, Chillicothe, IL (US); Daniel R. Ibrahim, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 684 days.

(21) Appl. No.: 12/217,622

(22) Filed: Jul. 8, 2008

(65) Prior Publication Data

US 2010/0005646 A1 Jan. 14, 2010

(51) Int. Cl.
*F16K 31/02* (2006.01)

(52) U.S. Cl. ............................... 251/129.16; 251/129.15

(58) Field of Classification Search ............. 251/129.15, 251/129.16
See application file for complete search history.

(56) References Cited

U.S. PATENT DOCUMENTS

| | | | |
|---|---|---|---|
| 3,368,791 A | 2/1968 | Wells | |
| 5,088,520 A | 2/1992 | Haynes et al. | |
| 5,582,153 A * | 12/1996 | Dutt et al. | 123/450 |
| 5,713,523 A * | 2/1998 | Fujikawa | 239/585.1 |
| 5,752,308 A | 5/1998 | Maley et al. | |
| 5,911,401 A | 6/1999 | Hrytzak et al. | |
| 5,924,674 A | 7/1999 | Hahn et al. | |
| 5,947,442 A * | 9/1999 | Shurman et al. | 251/129.19 |
| 6,550,699 B2 | 4/2003 | Nagai et al. | |
| 6,719,224 B2 | 4/2004 | Enomoto et al. | |
| 6,766,969 B2 | 7/2004 | Haltiner, Jr. et al. | |
| 6,848,669 B2 * | 2/2005 | Makino | 251/129.15 |
| 7,108,206 B2 | 9/2006 | Yacoub et al. | |
| 7,198,203 B2 | 4/2007 | Brenk et al. | |
| 2004/0195348 A1 | 10/2004 | Lewis et al. | |
| 2006/0138374 A1 | 6/2006 | Lucas et al. | |
| 2007/0215827 A1 | 9/2007 | Kaneko | |

FOREIGN PATENT DOCUMENTS

WO  2007128605  11/2007

* cited by examiner

*Primary Examiner* — John Fristoe, Jr.
(74) *Attorney, Agent, or Firm* — Liell & McNeil

(57) ABSTRACT

A solenoid actuator includes a hard guide piece and a soft flux piece. The hard guide piece has a stop surface ground to create a final air gap distance between the soft flux piece and a stator assembly when the stop surface on the guide piece is in contact with the stator assembly. The final air gap is set by grinding the stop surface on the guide piece so that the distance between the stop surface on the guide piece and a top surface on the soft flux piece along an axis of the guide bore is equal to the final air gap. The step of grinding the armature assembly may be done after attaching the guide piece and the flux piece together. In an exemplary embodiment, the step of grinding the stop surface and associated guide surface(s) are performed in a single chucking.

20 Claims, 2 Drawing Sheets

PRECISION GROUND ARMATURE ASSEMBLY FOR SOLENOID ACTUATOR AND FUEL INJECTOR USING SAME

TECHNICAL FIELD

The present disclosure relates to the field of solenoid actuators, and more particularly, to the field of solenoid air gap features in electronically controlled fuel injectors.

BACKGROUND

People skilled in the art recognize the goal to mass produce a solenoid actuator having smaller initial and final air gaps with improved parallelism between a stator assembly and an armature in a cost efficient manner. Even though it may be possible to produce a solenoid actuator assembly having a very small air gap and where the armature is parallel to the stator assembly, those in the art recognize there are significant costs involved in mass producing such assemblies.

Typical solenoid actuated fuel injectors include an armature connected to a valve member that controls the flow of fuel and/or pressure through the fuel injector. By having the armature connected to the valve member, the movement of the armature within the stator assembly may be compromised. By moving the armature with the valve member coupled thereto, the armature might travel at reduced speeds due to the increased mass, and any attempts to improve parallelism with the stator assembly were also hindered due to the tolerance stack ups that invariably increase during production with more connected parts. Moreover, in the past, some armature assemblies included a hard guide piece that was part of, or drove a fuel injection valve member, and a soft armature piece that served to enhance the magnetic forces acting on the armature. In order to improve parallelism and maintain a predetermined initial and final air gap, manufacturers used various category parts that took into account the inaccuracies that existed in the dimensions of the solenoid actuator assembly despite establishing very tight tolerances during mass production.

When the coil of the solenoid is energized, the armature moves towards the stator assembly, moving the valve member, and thereby controlling the fluid flow and/or pressure in the fuel injector. When the coil ceases to be energized, a mechanical spring or other bias forces the armature away from the stator assembly, causing the valve member to return to its original position and thereby controlling the fluid flow and/or pressure in the fuel injector again. It is known in the art that the time taken for the solenoid actuator, and hence the control valve of a fuel injector, to move from a first position to a second position and back again is a function of the highest possible forces acting on the armature over the shortest possible travel distance. It is desired by those in the art to reduce the time taken for the armature to travel from the initial air gap position to the final air gap position and back to the initial air gap position.

The magnetic forces acting on the armature are functions of the electromagnetic properties of the armature, the initial and final air gap between the armature and the stator assembly and the parallel orientation of the armature with reference to the stator assembly, including others. It is well known in the art that a magnetic field in a solenoid has the greatest force when the armature is parallel to the stator assembly and the air gap between them is as small as possible. Having a larger initial air gap will translate to the armature having a lower initial attraction force and maybe a larger travel distance, hence increasing the time taken to travel from the initial air gap position to the final air gap position. Having a smaller final air gap will allow for a smaller initial air gap and also allow a stronger magnetic force to act on the armature, hence increasing the speed at which the armature travels from the final air gap position to the initial air gap position and back. A lack of parallelism can create side forces leading to imbalance and increased wear at guide interfaces.

There has been an ongoing effort to improve parallelism in prior references, while striving to achieve the smallest final air gap. One prior art reference, U.S. Patent Application US2006/0138374 A1 teaches the use of an adjustable spacer coupled between the armature housing and the stator. The spacer is adjusted depending on the tolerance variation of the assembled parts. U.S. Pat. No. 6,550,699 teaches the use of plating a hard film layer on the armature as a spacer. The prior art, although geared towards achieving some of the goals this disclosure aims to achieve, have been met with limited success.

The present disclosure is directed to one or more of the problems set forth above.

SUMMARY

In one aspect, a method for assembling a solenoid actuator includes the steps of attaching a soft flux piece to a hard guide piece. A stop surface is ground on the guide piece relative to the top surface on the flux piece so that a final air gap is at a predetermined distance when the stop surface is in contact with a stator assembly.

In another aspect, a solenoid actuator assembly includes an armature assembly and a stator assembly. The armature assembly comprises a soft flux piece attached to a hard guide piece, which has a stop surface ground on it. The stator assembly defines a guide bore through which the guide piece is slidably received. The guide piece moves between a first position where the stop surface on the guide piece is in contact with the stator assembly, and the second position where the stop surface is out of contact with the stator assembly. Also, a final air gap is defined between a bottom surface on the stator assembly and a surface on the flux piece when the guide piece is in the first position.

In yet another aspect, a fuel injector assembly comprises an armature assembly. The armature assembly is made of a soft flux piece attached to a hard guide piece, which includes a stop surface. The guide piece moves between a first position where the stop surface on the guide piece is in contact with the stator assembly, but the guide piece is out of contact with a valve member. When moved to a second position, the stop surface is out of contact with the stator assembly, but the guide piece is in contact with the valve member.

DETAILED DESCRIPTION

Figure 1:
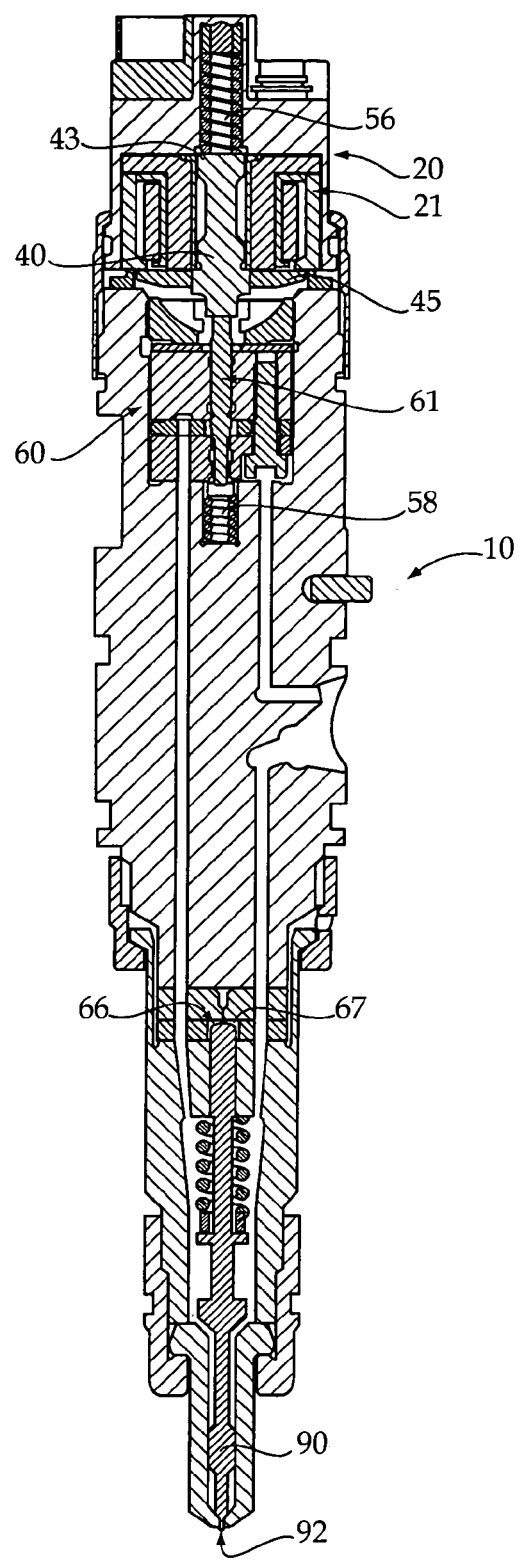
FIG. 1 is a sectioned front view of a fuel injector according to the present disclosure.

Referring to FIG. 1, a fuel injector 10 includes an electronically controlled valve assembly 60 and a valve nozzle 92 that is opened and closed by a valve needle 90. The electronically controlled valve assembly 60 includes a solenoid actuator assembly 20, a valve member 61, a first spring 56 having a first pre-load and a second spring 58 having a second pre-load. The solenoid actuator assembly 20 includes a stator assembly 21 and an armature assembly 40. The stator assembly 21 and armature assembly 40 are both made from various assembled parts. Valve needle 90 includes a closing hydraulic surface 66 exposed to fluid pressure in a needle control chamber 67. Energizing and de-energizing solenoid actuator assembly 20 moves valve member 61 to change pressure in needle control chamber 67 (via fluid connections not shown) to allow valve needle 90 to open and close valve nozzle 92 in a conventional manner.

Figure 2:
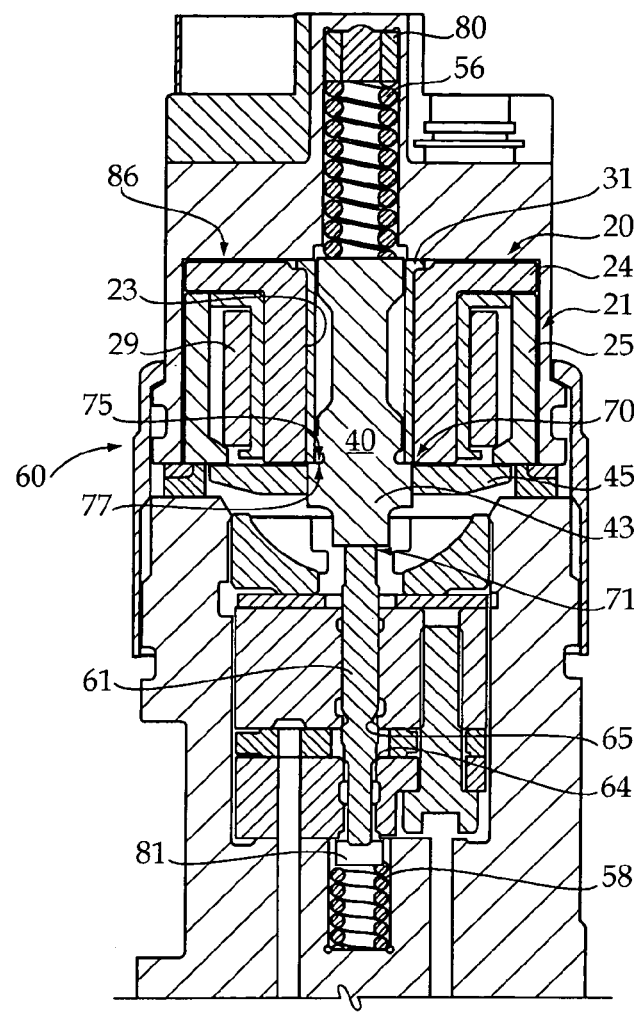
FIG. 2 is an enlarged sectioned front view of the control valve portion of the fuel injector shown in FIG. 1.
Figure 3:
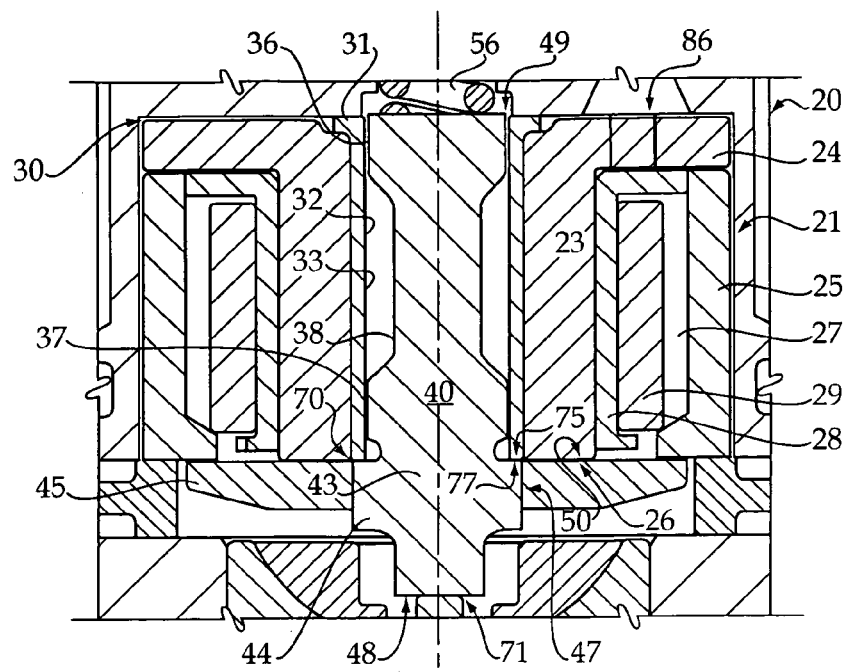
FIG. 3 is an enlarged sectioned front view of the fuel injector shown in FIG. 1.

Referring now to FIGS. 2 and 3, the stator assembly 21 includes an outer pole piece 25 attached to an inner pole piece 24, such as via welding them together at the weld joint 30. In other embodiments, other attachment mechanisms and locations may be used to attach the inner pole piece 24 to the outer pole piece 25. The pole pieces 24 and 25 may have co-planar bottom surfaces. As the pole pieces 24 and 25 are attached to each other, in this embodiment they share the same bottom surface, which is referred to as the planar bottom surface 26. In one embodiment, a coil 29 is carried on a bobbin 28 inside a cavity formed within the pole pieces 24 and 25. The remainder of the space between the pole pieces may be filled with plastic filler 27. Inner walls of the inner pole piece 24 form a pole bore 23 through which a guide sleeve 31 is attached. In one embodiment, the guide sleeve 31 may be press fitted through the pole bore 23 so that it fits snugly along the inner walls of the inner pole piece 24. Other embodiments may contemplate other ways of attaching the guide sleeve 31 to the inner walls of the inner pole piece 24, such as a weak press fit accompanied by a weld. The guide sleeve 31 has an inner diameter surface 32, which defines a guide bore 33. The guide bore 33 has a longitudinal axis 35 that is perpendicular to the planar bottom surface on the pole piece 26. The guide sleeve 31 has a stop surface 77, which is the bottom surface on the guide sleeve 31 and in one embodiment, it may be flush with, or be considered part of the bottom surface 26. In one embodiment of the disclosure, the bottom surface 26 on the entire stator assembly 21 is machined to form a planar bottom surface on the entire stator assembly 21. Those skilled in the art will recognize that guide sleeve 31 and pole pieces 24 and 25 may be made from the same or different materials. For instance, pole pieces 24 and 25 may be chosen for their magnetic flux channeling capacities, but the guide sleeve material may be chosen more for wear characteristics in guide bore 33 and stop surface 77.

Figure 4:
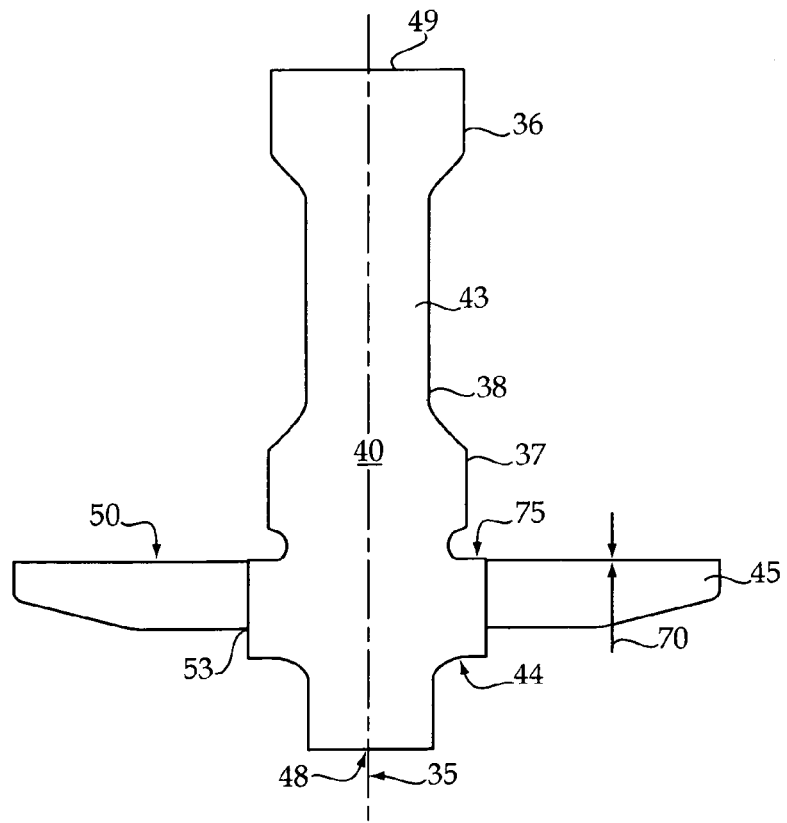
FIG. 4 is a sectioned front view of an enlarged armature assembly of the fuel injector shown in FIG. 1.

Referring now to FIG. 4, the armature assembly 40 includes a guide piece 43 made of a hard material which exhibits impact resistant properties and a flux piece 45 made of a soft material which exhibits high magnetic properties. The flux piece 45 may be attached to the guide piece 43 at a weld joint 53. In many embodiments, the pieces may be attached by welding the pieces together, press fitting them or using a combination of a light press fit and a weld, among other attachment strategies. The guide piece 43 includes at least one guide surface 36 and 37, an enlarged diameter portion 44 and a stop surface 75 located on the portion 44. In the embodiment shown in FIG. 4, the guide piece 43 has a first guide surface 36, a second section or guide surface 37 and a reduced diameter section 38. By reducing the diameter on the guide piece 43 in section 38, the armature assembly 40 has a lower mass and therefore, requires a smaller force to displace the armature assembly 40. In one embodiment, the outer surface on the guide piece, including the first guide surface 36 and second guide surface 37, may be ground after attaching the guide piece 43 to the flux piece 45 in such a manner that when the guide piece 43 is received in the guide bore 33, the guide clearance along the inner diameter surface 32 on the guide sleeve 31, and hence the guide sleeve 31 itself, is so small resulting in a much improved parallelism between the top surface 50 on the flux piece 45 and the planar bottom surface 26. Thus, armature assembly 40 may be guided through the guide bore 33 via an interaction between the guide piece 43 and the guide sleeve 31. Furthermore, the stop surface 75 on the guide piece 43 will not be planarly flush with a top surface 50 on the flux piece 45 in an exemplary embodiment. The distance between the stop surface 75 on the guide piece 43 and the top surface 50 on the flux piece 45 along the axis 35 of the guide bore 33 is a predetermined final air gap 70. In one embodiment of the disclosure, a final air gap of about 0.05 mm can be achieved on a consistent basis while maintaining efficient operating costs. The term "about" means that when the number is rounded to a like number of significant digits, the numbers are equal. Thus, both 0.045 and 0.054 are about 0.05.

One other aspect of the disclosure teaches the step of grinding the stop surface 75 on the guide piece 43 to be performed after the flux piece 45 is attached to the guide piece 43. Conventional wisdom in the art focuses on producing pieces with ever increasing tightened tolerances so that after attachment, the tolerance stack-ups would not amount to substantial variations. This disclosure resolves the problems faced by others in the art by allowing parts to be manufactured under less stringent tolerances, attaching the pieces together and then grinding the surfaces on the pieces in a single chucking. This produces an armature assembly 40 that compensates for the tolerance variations in the geometric dimensions of each individual piece while producing a much more accurate orientation between the guide piece 43 and the guide sleeve 31. The grinding step may be performed by grinding a stop surface 75 on the shoulder of the guide piece 43, such that the stop surface 75 is parallel to the flux piece 45 of the armature assembly 40 and is at a distance equivalent to the final air gap 70. Also, the grinding step can include grinding the guide surfaces 36 and 37 of the guide piece 43 and grinding the stop surface 75 on the guide piece 43 in a single chucking. This will allow a more improved orientation of the guide piece 43 into the guide bore 33 and also allow the guide piece 43 to have an orientation that is perpendicular to the flux piece 45, improving the parallelism between the flux piece 45 and the bottom planar surface 26.

In FIGS. 1, 2 and 3, the armature assembly 20 is shown in a first position. In the first position, the coil 29 is energized causing the solenoid actuator 20 to apply a pulling force on the armature assembly 40 bringing stop surface 75 of the armature assembly 40 in contact with the stop surface 77, which is part of the planar bottom surface 26 of the stator assembly 21. The armature assembly 40 may have a larger travel distance than the valve member 61 in order to be decoupled from the valve member 61. In this position, armature assembly 40 is out of contact with the valve member 61, resulting in a gap 71 between the armature assembly 40 and valve member 61. The stop surface 75 on the guide piece 43, however, comes into contact with the stop surface 77 on the guide sleeve 31. A final air gap 70 is formed between the planar bottom surface 26 and the top planar surface 50 on the flux piece 45. Furthermore, the first spring 56 remains in contact with the guide piece 43 and exerts a first pre-load bias force on the guide piece 43 in a direction away from stator assembly 21. The second spring 58 exerts a second pre-load bias on the valve member 61 forcing the valve member 61 to move from the lower valve seat 64 toward upper valve seat 65 in a conventional manner.

The armature assembly 40 moves toward a second position when the coil 29 is de-energized. The stop surface 75 on the guide piece 43 moves out of contact with the stop surface 77 on the guide sleeve 31. The guide piece 43, however, is in contact with valve member 61 and valve member 61 moves into contact with lower seat 64 under the action of first spring 56. Furthermore, the first spring 56 now has a greater pre-load than the pre-load of the second spring 58 so that valve member 61 will move to its lower seat when coil 29 is de-energized. The distance between the planar bottom surface 26 and the top planar surface 50 on the flux piece 45 along the longitudinal axis 35 of the guide bore 33 is equivalent to an initial air gap.

By decoupling the action of solenoid assembly 20 from valve member 61 slight misalignments between an axis of valve member 61 and guide axis 35 can be tolerated with altering performance. In addition, the speed of the valve member 61 moving between seats 64 and 65 are determined primarily by respective pre-loads on springs 56 and 58, which may be set precisely with respective spacers 80 and 81. Seats 64 and 65 may be considered as first and second stops for valve member 61. The decoupled solenoid assembly 20 can now function with greater precision and may allow for a smaller initial and final air gap 69 and 70. Furthermore, by decoupling the armature assembly 40 and the valve member 61, the armature assembly 40 will function independently of the valve member 61 as long as the armature assembly 40 travels faster than the valve member 61. This also desensitizes the valve member 61 from any misalignments that may occur due to construction tolerance variances and any lateral shifting in the armature assembly 40 in order to improve parallelism between the armature assembly 40 and the stator assembly 21.

INDUSTRIAL APPLICABILITY

The present disclosure finds potential application in any solenoid assembly in any machine. Although this particular embodiment of the disclosure is directed towards an electronically controlled valve assembly for use in a common rail fuel injector, the disclosure is not limited to fuel injectors and could find applicability in a much broader array of industries that use solenoid actuators. The present disclosure finds particular application to fuel injectors used in compression ignition engines. Other fuel injector applications include, but are not limited to, cam and/or hydraulically actuated fuel injectors. Electronically controlled valve assemblies may be used to control the flow of fluids and/or pressure through a fuel injector. In the present disclosure, the valve assembly performs repeated cycles of movement at an extremely high rate over many millions of cycles.

The solenoid actuator 20 has two states. An off or de-energized state, which corresponds to the second position of the armature assembly 40 and an on or energized state, which corresponds to the first position of the armature assembly 40. In the off state, the solenoid actuator 20 is switched off and no current is passing through the coil 29 of the solenoid actuator 20. As there is no current passing through the coil 29, there are no magnetic forces produced within the stator assembly 21. The first spring 56 exerts a force on the armature assembly 40 and the valve member 61 causing them to be pushed away from the stator assembly 21 to stop when valve member 61 contacts lower seat 64. The second spring 58 exerts an opposite force on the valve member 61 and the armature assembly 40 towards the stator assembly 21 but the force is not great enough to overcome the force exerted by the first spring 56. Therefore, the net resulting force from the two springs 56 and 58 causes the valve member 61 to assume a second stop position in contact with the valve seat 64 that corresponds to either an open or a closed position which in turn controls the flow of fluid and/or pressure through the fuel injector 10 depending on the configuration of the valve assembly 60. The armature assembly 40 is positioned away from the planar bottom surface 26 and the distance from the planar surface 50 of the flux piece 45 to the planar bottom surface 26 of the stator assembly 21 along the longitudinal axis 35 of the guide bore 33 is the initial air gap.

As the solenoid actuator 20 is switched to its on state, the armature assembly 40 moves from its second position to its first position. Switching the solenoid actuator 20 on energizes the coil 29. The coil 29 produces a magnetic field around the stator assembly 21 and creates a magnetic force in the surrounding region. The force of the magnetic field is strong enough to pull the armature assembly 40 towards the stator assembly 21. This force is greater than the force of the spring 56 hence causing the armature assembly 40 to move towards the stator assembly 21. In addition, when the armature assembly 40 is pulled towards the stator assembly 21, the armature assembly 40 may be pulled faster than the valve member 61 is pushed upward by the second spring 58. This allows the armature assembly 40 to lose contact with the valve member 61. The valve member 61 moves from the second stop position to a first stop position that corresponds to either an open or a closed position which in turn controls the flow of fluid and/or pressure through the fuel injector 10 depending on the fluid configuration of the valve assembly 60. The guide piece 43 moves up the guide bore 33 of the stator assembly 21 maintaining a guide clearance with the guide sleeve 31. The guide piece 43 stops moving when the stop surface 75 on the guide piece 43 comes in contact with the stop surface 77 on the guide sleeve 31. A top surface 49 on the guide piece 43 remains in contact with the first spring 56. The distance between the planar bottom surface 26 of stator assembly 21 and the top surface 50 on the flux piece 45 is at its smallest distance, corresponding to the final air gap 70, and may be equal to the distance between the stop surface 75 on the guide piece 43 and the top surface 50 on the flux piece 45. When the armature assembly 40 is in the first position, the first spring 56 exerts a bias force on the guide piece 43. However, as long as the coil 29 is energized, the magnetic force is exerted on the armature assembly 40 and the armature assembly 40 remains in the first position. Depending on the fluid connections, fuel injection events may be initiated and ended by energizing and de-energizing solenoid actuator 20 in a known manner.

Finally, the solenoid actuator 20 is turned off again and the coil 29 is de-energized. The coil 29 no longer provides a magnetic force therefore allowing the net resulting force of the springs 56 and 58 to force the armature assembly 40 to move from the first position to the second position again. The first spring 56 exerts a force on the top surface 49 on the guide piece 43. The stop surface 75 on the guide piece 43 loses contact with the stop surface 77 on the guide sleeve 31, while the bottom impact surface 48 on the guide piece 43 comes back in contact with the valve member 61 pushing the valve member 61 back to its original position, and thereby allowing the valve member 61 to control the fluid flow and/or pressure through the fuel injector 10 again. The armature assembly 40 finally stops when it reaches the second position, wherein the distance between the flux piece 45 and the planar bottom surface 26 is equal to the initial air gap 69.

The armature assembly 40 continues to move from the second position to the first position and back as long as the solenoid actuator 20 is turned on and turned off. This continuous process demonstrates why it may be important for the impact surfaces of the guide piece 43 to be made of a hard, impact resistant material. The continuous pounding of the bottom surface 48 and the stop surface 75 of the guide piece 43 with member 61 and the guide sleeve 31, respectively, cause wear and tear on the surfaces on the guide piece 43 possibly requiring the impact surfaces of guide piece 43 to be made of a material able to withstand these impacts over extended periods of use. It is known to those in the art that the flux piece 45 should be made of a soft material possessing superior magnetic properties in order to move between the first and second position with less force than might otherwise be needed. With the structure shown, the travel distance of valve member 61 will inherently be smaller than the travel distance of armature assembly 40.

This disclosure provides numerous ways to reduce the initial and final air gap of solenoid actuators and improve parallelism between the top surface 50 on the flux piece 45 and the bottom surface 26 on the stator assembly 21. Grinding the stop surface 75 on the guide piece 43, after attaching the armature assembly 40, may permit smaller geometric variations than in the past. Grinding the surface 75 after the attaching step eliminates the need to develop parts with ever increasingly tightened geometric tolerances because the grinding step after attachment allows parts with larger geometric variations to be ground to the same predetermined dimensions. Furthermore, when the armature assembly 40 is ground (guide surfaces 36, 37 and stop surface 75) in a single chucking, the guide piece 43 and the flux piece 45 are oriented more accurately than if ground in more than a single chucking. This produces an improved, more geometrically aligned stop surface 75 on the guide piece 43 and better parallelism between the top surface 50 on the flux piece 45 and the planar bottom surface 26 of the stator assembly 21.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A solenoid actuator assembly, comprising:
   an armature assembly including a flux piece attached to a guide piece;
   a stator assembly that includes an inner pole piece with an inner wall in contact with a guide sleeve defining a guide bore;
   the guide piece being slidably received in the guide bore, and having a stop surface movable between a first position in contact with the stator assembly and a second position out of contact with the stator assembly;
   an air gap being defined between a bottom surface on the stator assembly and a top surface on the flux piece when the guide piece is in the first position.

2. The solenoid actuator assembly in claim 1 wherein a distance between the top surface on the flux piece and the stop surface along an axis of the guide bore equals the air gap.

3. The solenoid actuator assembly in claim 1 wherein the flux piece is welded to the guide piece.

4. The solenoid actuator assembly in claim 1 wherein the flux piece is press fitted onto the guide piece.

5. The solenoid actuator assembly in claim 1 wherein the air gap is about 0.05 mm.

6. The solenoid actuator assembly in claim 1 wherein the armature assembly is guided via an interaction between the guide piece and the guide sleeve of the stator assembly.

7. The solenoid actuator assembly in claim 6 wherein the guide piece includes a first guide surface separated from a second guide surface by a reduced diameter section; and
   a valve member unattached to but in contact with the guide piece.

8. The solenoid actuator assembly of claim 1 wherein the bottom surface, which is partially defined by the guide sleeve and the inner pole piece, is planar.

9. The solenoid actuator assembly of claim 1 including a first spring that biases the armature assembly away from the stator assembly; and
   a second spring that biases the armature assembly toward the stator assembly.

10. The solenoid actuator assembly of claim 1 wherein the stator assembly includes a coil positioned in a cavity defined by the inner pole piece and an outer pole piece.

11. The solenoid actuator assembly of claim 1 including a valve member out of contact with armature assembly at the first position, but the valve member being in contact with the armature assembly at the second position.

12. The solenoid actuator assembly of claim 1 including a valve member that moves a valve travel distance between a first stop and a second stop;
   the armature assembly moves an armature travel distance between the first position and the second position; and
   the armature travel distance is greater than the valve travel distance.

13. A solenoid actuator assembly, comprising:
   an armature assembly including a flux piece attached to a guide piece;
   a stator assembly having a planar bottom surface
   the guide piece having a stop surface movable between a first position in contact with planar bottom surface of the stator assembly and a second position out of contact with the stator assembly;
   the flux piece being out of contact with the stator assembly at both the first position and the second position, the flux piece being separated from the planar bottom surface of the stator assembly by an air gap at the first position; and
   a distance between a top surface on the flux piece and the stop surface of the guide piece along an axis of the guide piece equals the air gap.

14. The solenoid actuator assembly in claim 13 wherein the final air gap is about 0.05 mm.

15. The solenoid actuator assembly in claim 13 wherein the guide piece includes a first guide surface separated from a second guide surface by a reduced diameter section; and
   a valve member unattached to, but in contact with, the guide piece.

16. The solenoid actuator assembly of claim 13 wherein the bottom surface, which is partially defined by the guide sleeve and the inner pole piece, is planar.

17. The solenoid actuator assembly of claim 13 including a first spring that biases the armature assembly away from the stator assembly; and
   a second spring that biases the armature assembly toward the stator assembly.

18. The solenoid actuator assembly of claim 13 wherein the stator assembly includes a coil positioned in a cavity defined by the inner pole piece and an outer pole piece.

19. The solenoid actuator assembly of claim 13 including a valve member out of contact with armature assembly at the first position, but the valve member being in contact with the armature assembly at the second position.

20. The solenoid actuator assembly of claim 13 including a valve member that moves a valve travel distance between a first stop and a second stop;

the armature assembly moves an armature travel distance between the first position and the second position; and the armature travel distance is greater than the valve travel distance.

* * * * *